May 19, 1970 R. DAUB 3,512,791
LIGHT METAL PISTON WITH PISTON RING GROOVE ARMORING MEANS
Filed Aug. 23, 1967 3 Sheets-Sheet 1

INVENTOR.
RUDOLPH DAUB
BY Frank Q. Bower
ATTORNEY

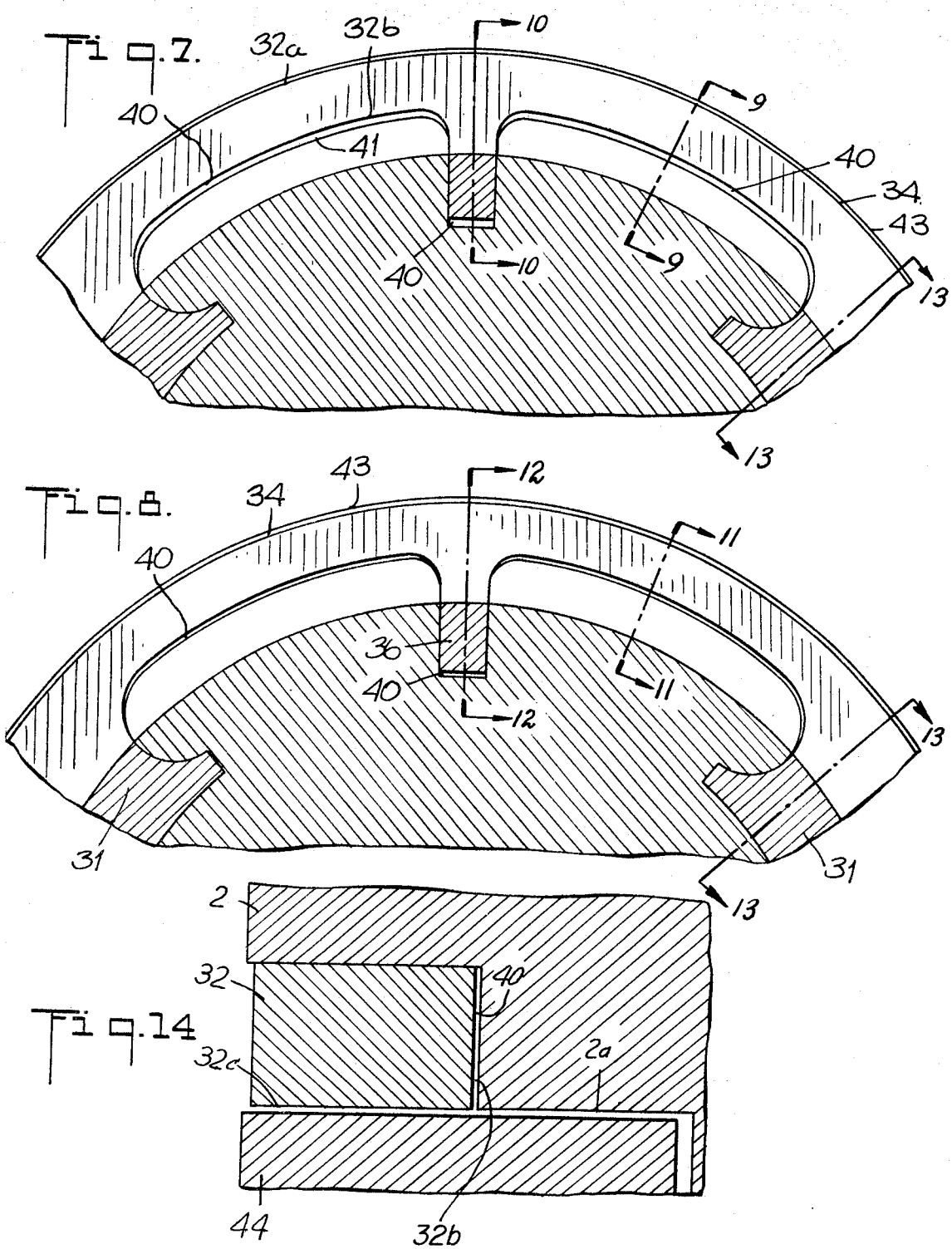

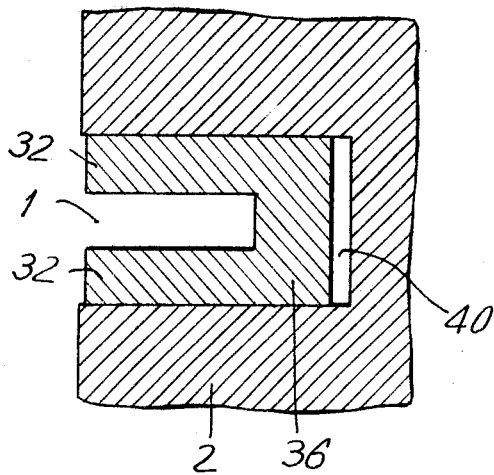
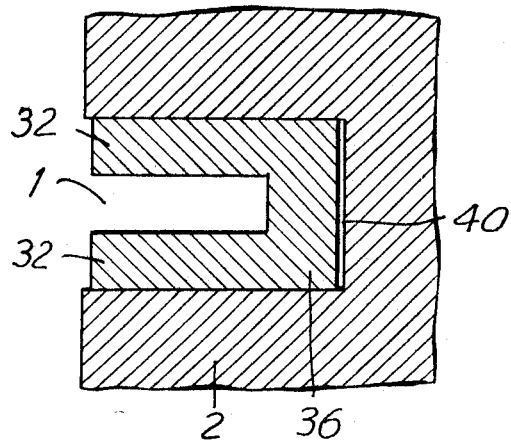
Fig. 10        Fig. 12
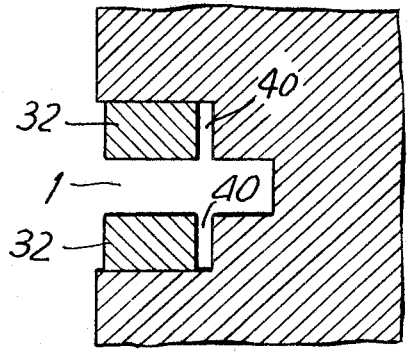
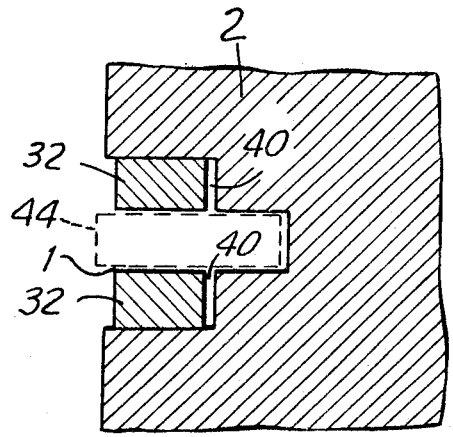
Fig. 9        Fig 11
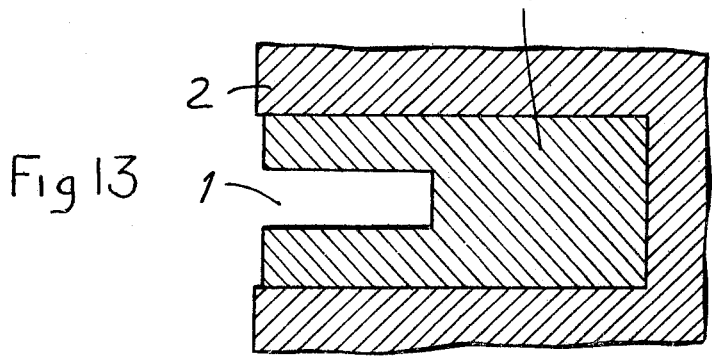
Fig 13
INVENTOR.
Rudolph Daub

United States Patent Office 3,512,791
Patented May 19, 1970

3,512,791
LIGHT METAL PISTON WITH PISTON RING GROOVE ARMORING MEANS
Rudolph Daub, 9 Hickory Drive,
North Caldwell, N.J. 07006
Continuation-in-part of application Ser. No. 316,932,
Oct. 17, 1963. This application Aug. 23, 1967, Ser.
No. 662,622
Claims priority, application Germany, Mar. 7, 1963,
M 56,017, Patent 1,184,569
Int. Cl. F16j 9/00, 9/22
U.S. Cl. 277—189.5     3 Claims

ABSTRACT OF THE DISCLOSURE

The internal combustion engine piston is made of aluminum or aluminum alloy and has an iron ring means armoring the piston ring grooves. The armoring means has widely spaced radial and axial anchors and interconnecting circumferential portions radially movable relative to the piston and the anchoring means.

RELATED APPLICATIONS

This is a continuation-in-part of my copending application Ser. No. 316,932 filed on Oct. 17, 1963 and entitled Light Metal Piston, now abandoned and claiming a prior ity date of Mar. 7, 1963, the filling date of the German application Ser. No. M 56,017, now German Patent No. 1,184,569.

BACKGROUND OF THE INVENTION

This invention pertains to a light metal piston, particularly for internal combustion engines, whose ring groove sides are armored by means of a cast-in insert of a harder but elastic metal, such as steel or iron. The insert consists of a ring portion extending inwardly from the outer surface of the piston to a radial depth not exceeding the depth of the ring groove, and further consists of radial hooks attached to the ring portion at several points along its inner circumference, whereby the ring portion is cast anchored into the piston head.

In such previous pistons the inner edge of the ring portion is formed at an angle to assure a satisfactory axial lock between the ring portion and the side of the groove. In these previous pistons it was also necessary to provide a comparative large number of radial hooks to reduce the span of the ring portion between radial hooks in order to prevent radial and axial bending of the ring portion, particularly during the cooling and heating of the piston, and to absolutely assure that the only stresses the ring portion of the insert was subjected to were compression during shrinking (cooling) or stretching (tension) during expansion (heating) of the piston.

Also, in some pistons it was further necessary to use two sandwiched inserts per one piston ring groove in order to provide correctly facing dovetail angles at the inner edge of the ring portions.

SUMMARY OF THE INVENTION

The piston ring grooves of the aluminum piston are provided with armoring insert means that extend circumferentially to provide a continuous or substantially continuous armored piston ring groove outer edge with axial and radial locking means widely spaced circumferentially, so that the ring or circumferential portions between the axial and radial locking portions are permitted to flex relatively to the piston head in a radial direction only. The ring or circumferential portions have an intermediate projection which provides for an axial and tangential anchoring while permitting radial movement.

The invention described herein avoids the necessity for angles to lock the ring portion of the insert in an axial direction, thereby making it possible to fabricate a one piece insert to reinforce both radial sides of a ring groove, although only one side can be reinforced if so desired.

The invention provides means to anchor the ring portion of the insert in an axial direction against inertia forces and also in a tangential direction to sustain the loads while the groove is being machined. This also permits the number of the comparatively heavy radial hooks to be reduced in contrast to previous pistons in which the inner side of the ring portion was only provided with a dovetail capable of axial locking, so that a larger number of hooks was required to hold the insert against tangential loads of the cutting tool.

The reduction of the number of hooks renders the ring portions of the insert long and slender enough so the ring portions will readily bend during the cooling of the light metal piston body during casting and also during engine operation in which the aluminum piston expands and shrinks more than an iron insert. The ring portions are spaced from the piston head. This makes it possible to fabricate the insert from low cost steel or iron, rather than from costly nickel irons which are presently used in some cases because their expansion coefficient is closer to that of aluminum.

Another novel feature is the location of a projection between the hooks on the inside of the ring portion of the insert. The projection anchors the ring portion axially and tangentially, leaving the ring free to distort radially when subject to bending and subjecting the hooks and their anchorage in the aluminum body to minimum stresses, in contrast to insert yielding stresses within the ring by compression or tension.

The insert can be manufactured by either stamping or casting methods from ordinary steels, bronzes or iron. The total absence of undercuts or dovetails in an axial direction assures low manufacturing costs in both shop and foundry.

Other characteristics of the invention will be apparent from the following description and accompanying drawings.

BRIEF DESCRIPTION OF THE DRAWINGS

FIG. 7 is a fragmentary view of a portion of FIG. 1 with the piston at normal temperatures.
FIG. 8 is a fragmentary view of a portion of FIG. 1 with the piston at operating temperatures.
FIG. 9 is a sectional view taken along lines 9—9 of FIG. 7.
FIG. 10 is a sectional view taken along lines 10—10 of FIG. 7.
FIG. 11 is a sectional view taken along lines 11—11 of FIG. 8.
FIG. 12 is a sectional view taken along lines 12—12 of FIG. 8.
FIG. 13 is a sectional view taken along lines 13—13 of FIG. 7 or 8.
FIG. 14 is an enlarged fragmentary view of FIG. 11.

DETAILED DESCRIPTION

Figure 1:
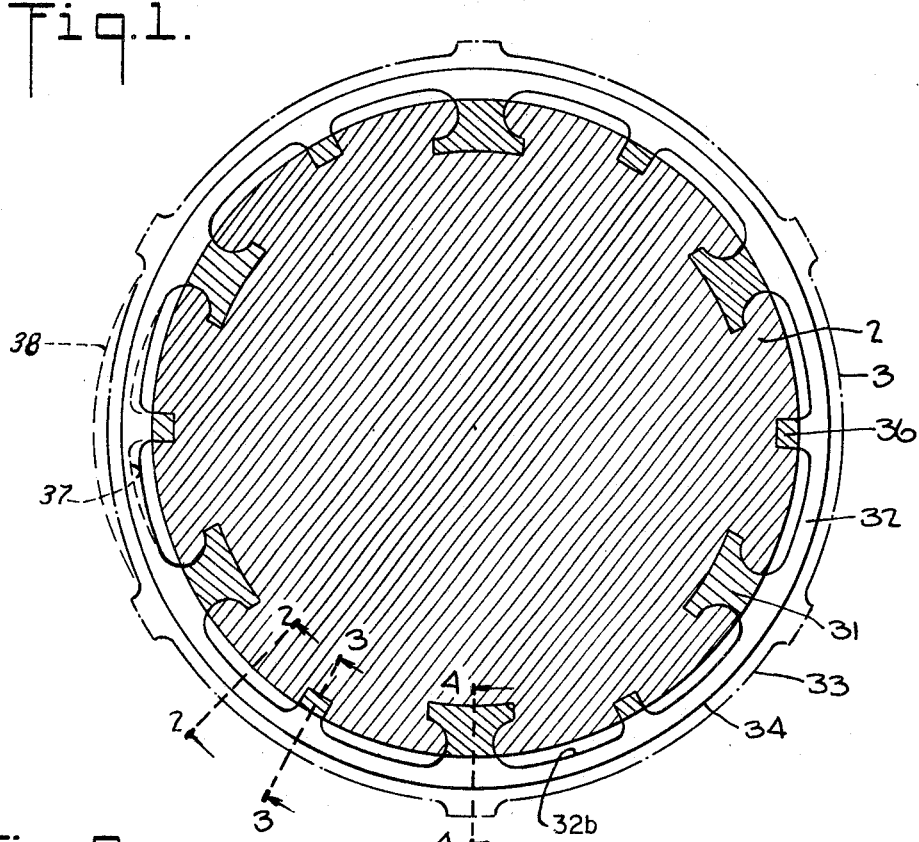
FIG. 1 shows a cross section through the reinforced groove of a piston.
Figure 2:
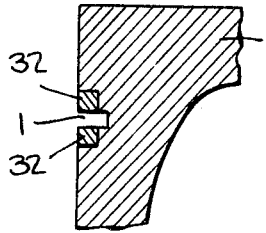
FIGS. 2, 3 and 4 are fragmentary sections taken on the lines 2—2, 3—3 and 4—4 of FIG. 1.
Figure 3:
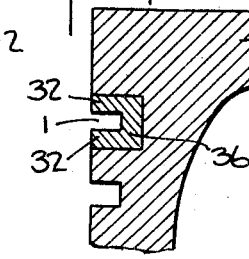
Figure 4:
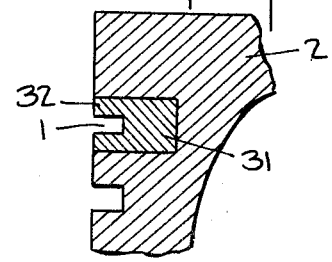

Referring to FIGS. 1 to 14, a single piece insert 3 is cast into the body of a light metal piston head 2. The insert is provided with radial hooks or anchoring means 31 attached to the inside diameter of a closed ring 32. The inside diameter of ring 32 is preferably larger than the inside diameter of ring groove 1. The outside diameter of ring 32 before being machined is larger than the diameter of the unmachined piston 2. During the machining of the piston the part between the contours 33 and 34 is eliminated. Outer contour 34 then substantially coincides with the outer contour or surface 43 of the piston head. The outer contour 34 is slightly recessed from the surface 43 to prevent the engagement of the cylinder wall by the insert.

Located between the anchoring means or hooks 31 are radial projections 36 also fastened to the inside diameter of ring 32. These projections have straight sides, i.e., no hooks or dovetails. Their radial length extends beyond the inside diameter of the ring groove. These projections permit movement between themselves and the piston body in a radial direction only. In an axial direction and in a tangential direction the projections form a support for the ring 32 during machining and after machining of the groove for the upper and lower portions of the ring 32. The axial support of the ring by the projections is necessary to sustain the inertia forces during rapid reciprocation while the tangential lock is required to sustain the tool loads during machining of the piston, the insert faces, and the ring groove.

In casting the piston an insert with an inside diameter formed by the inwardly facing axially extending surfaces 326 and with an outside diameter formed by the outer contour 33 shown in dot dash lines is placed into a mold (not shown) with molten light metal poured into the mold and around the insert. The light metal may be aluminum or aluminum alloy. During the cooling period the light metal shrinks more than the iron insert. The hooks 31 follow the greater shrinkage of the light piston metal and are pulled towards the center of the piston. As a result the ring portion is put under severe stress and the inside and outside diameters are deformed as shown exaggerated by broken lines 37, 38 in FIG. 1. The deformation is slightly increased when the piston is machined because the ring is weakened through the elimination of the part located between the contours 33 and 34 and also by cutting the ring groove. Removing the metal reduces the resistance of the ring to yield and also simultaneously lowers the load on the hooks 31. The projection 36 assures that the ring deformation takes place in the radial plane only, as shown, and not in an axial direction, the latter being disadvantageous to a firm retention of the insert.

In FIGS. 7 to 12 enlarged views of the relation of the insert and the piston head are shown to better illustrate the spacing between the circumferential or ring portions 32a between the anchoring means. The ring portions 32a form a space 40 with the piston head 2. This space is defined by the inwardly facing axially extending surface 32b on the insert and the outwardly facing axial surface 41 on the piston head. This spacing is formed by the deformation of the insert due to the difference in shrinkage between the piston head and the insert as previously described and is in the order of thousandths of an inch. On operation of the piston the piston head and insert are increased to the operating temperatures. The aluminum piston head having a greater expansion than the insert causes the spacing 40 to decrease, as illustrated in FIGS. 8, 11 and 12. The outer contour 34 of the insert is slightly recessed from the outer surface 43 of the piston. The anchoring means 31 are firmly interlocked with the piston head on expansion and contraction so that no spacing occurs as is illustrated in FIGS. 1, 4, 7, 8 and 13. Thus the circumferential or ring portions 32a move relative to the piston head. The projection 36, as illustrated in FIGS. 1, 3, 10 and 12 also moves radially with the circumferential ring portions 32a with the space 40 larger at normal room temperatures and smaller at the operating temperatures.

Thus during different operating temperatures of the piston the insert is free to bend without loosening the anchorage between the hooks and the piston body. This permits the use of ordinary low cost iron as insert material in spite of the difference between the expansion coefficients of the piston metal and insert. The aluminum coefficient of expansion is twice that of iron.

Figure 5:
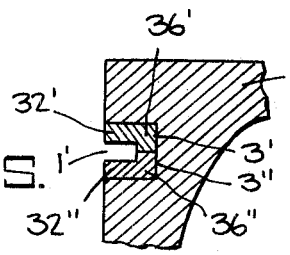
FIG. 5 shows a fragmentary section similar to FIG. 3 but with the insert made of two sandwiched pieces.
Figure 6:
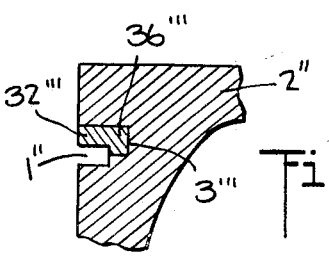
FIG. 6 shows a fragmentary section of a ring groove in which only one side of the groove is reinforced.

The embodiment shown in FIG. 5 differs from the embodiment shown in FIGS. 1 to 7 in that instead of a single insert having a thickness greater than the piston ring groove 1', two thinner contacting inserts 3', 3" in a sandwich construction are embedded in the piston 2'. The inserts have upper and lower rings 32', 32" with projections 36', 36" corresponding to rings 32 and projections 36 of the embodiment of FIG. 1. This latter embodiment is advantageous where it is desirable to have the inserts stamped from the thinnest possible stock. In FIG. 6 only one side of a piston ring groove 1" is reinforced by means of the thin stamped insert 3" with ring 32''' and projection 36'''.

In FIG. 14 an enlarged view is shown of the piston with a piston ring 44. The piston is at the operating temperatures in this view and illustrates the spaces 40 formed by the ring portions 32a and the piston head 2. It is seen from this illustration that the spaces 40 do not detract from the sealing surfaces 32c on the ring portions and the surface 2a on the piston against which the piston ring 44 seats. Each of the spaces 40 has a substantial axial length compared to its radial width and function as a labyrinth seal between the piston ring 44 and the respective surfaces 32c so that the spaces 40 function as an additional means to prevent the passage of the explosive gases around the piston ring.

The piston in accordance with this invention has fewer radial anchoring means than the reinforced pistons of the prior art. The prior inserts are intimately interlocked with the piston around its circumference. In a five inch diameter prior piston twenty or more radial locks are provided. In FIG. 1 a specific embodiment of the invention is shown in which an approximately five inch diameter piston has six radial locks with a single projection provided between the radial locks. Fewer radial locks could be used, for example, three radial locks with two or more projections 36 could be used between adjacent radial locks. It is thus seen that the number of radial locks is greatly reduced, which lightens the piston. This reduction in the number of radial locks reduces the weight of the insert and the weight of the reinforced aluminum piston so that dynamic forces are closer to those of aluminum pistons without an insert. This simplifies the balancing of an engine on the replacement of aluminum pistons with reinforced aluminum pistons. Also, the dovetail feature is eliminated which reduces the cost of the manufacture of the pistons and one single piece insert can reinforce the upper and lower surfaces.

The invention is set forth in the appended claims.

I claim:
1. An internal combustion engine piston with a piston ring groove comprising a light metal piston head having an outer cylindrical surface, radial surfaces extending radially inward normal to said cylindrical surface and spaced radially therefrom, and axially extending outwardly facing circumferentially extending walls intermediate said piston ring groove and intersecting said radial surfaces; insert means made of a metal having a lesser coefficient of expansion than said piston head and harder than said light metal piston head and having radial surfaces normal to said cylindrical surface and being between said outer cylindrical surface and a respective radial piston head surface to form with said radial piston head surfaces armored composite piston ring groove surfaces defining said piston ring groove, said insert means having anchoring means and bendable circumferentially extending portions having a radial depth less than the radial depth of the piston ring groove; said anchoring means being circumferentially spaced widely apart and axially, radially and circumferentially locked in said metal piston head on non-relative movement therewith; said circumferentially extending portions integral with said anchoring means and having axially extending walls inwardly facing said respective outwardly facing walls of said piston head and radially spaced therefrom to form circumferentially extending spaces therebetween intermediately intersecting said piston ring groove; and said circumferentially extending portions being radially movable relative to said piston head and said anchoring means for flexing radially in relation to said piston head to vary the width of said circumferentially extending spaces in expansion and contraction of said piston in response to the difference in coefficient of expansion of said piston head and said insert means.

2. An internal combustion engine piston as set forth in claim 1 wherein said bendable circumferentially extending portions have projections extending radially inward from said circumferentially extending portions for axially and circumferentially holding said circumferentially extending portions, said projections having generally radially extending side walls and having inwardly facing end walls forming spaces with said piston head for permitting relative radial movement between said projections and said piston head with the relative movement of said circumferentially extending portions thereto.

3. An internal combustion engine piston comprising a head having a piston ring groove, an outer cylindrical surface, radial surfaces normal to said cylindrical surface and spaced radially inward therefrom, axially and circumferentially extending outwardly facing walls between said radial surfaces and said cylindrical surface; insert means made of metal having a lesser coefficient of expansion than said piston head and harder than said light metal piston head, said insert means having circumferentially spaced anchoring means and circumferentially extending portions with axially and circumferentially extending walls inwardly facing said outwardly facing walls of said piston head, said anchoring means being axially, radially and circumferentially locked in said piston head, said circumferentially extending portions formed as a single piece with said anchoring means and having a radial depth less than the depth of the piston ring groove and radical surfaces extending radially inward between said outer cylindrical surface and a respective piston head surface to form composite piston ring groove surfaces with said piston head radial surfaces, characterized by said axial walls of said piston head and said circumferentially extending portions being radially separated to form spaces therebetween and intersecting said piston ring groove surfaces and said circumferentially extending portions being bendable in relation to said piston head to vary the width of said spaces on expansion and contraction of said piston in response to the difference in coefficient of expansion between said piston head and said insert means.

References Cited

UNITED STATES PATENTS

| | | | |
|---|---|---|---|
| 2,990,225 | 6/1961 | Bucken et al. | 277—189.5 |
| 3,023,061 | 2/1962 | Daub | 277—189.5 |

FOREIGN PATENTS 607,966   9/1948   Great Britain.

SAMUEL ROTHBERG, Primary Examiner

U.S. Cl. X.R.

92—277